Sept. 16, 1941.   J. H. BENDER   2,256,231
CAMBER ADJUSTING DEVICE
Filed April 5, 1941
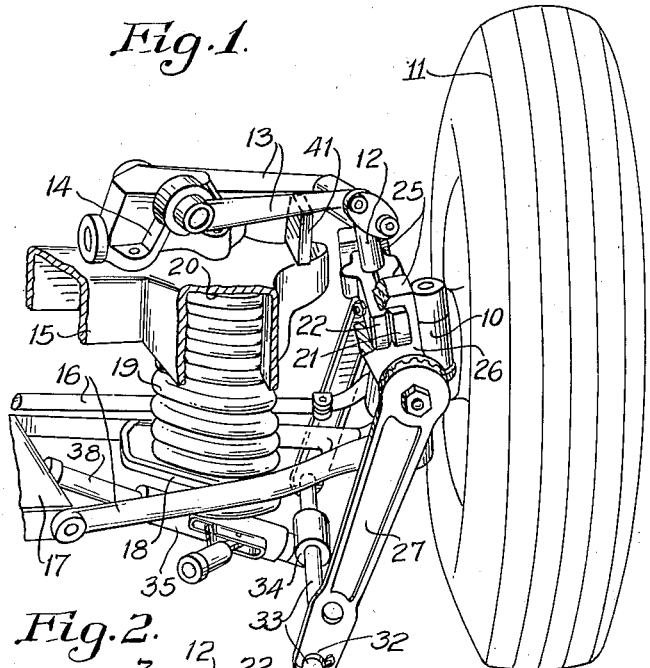
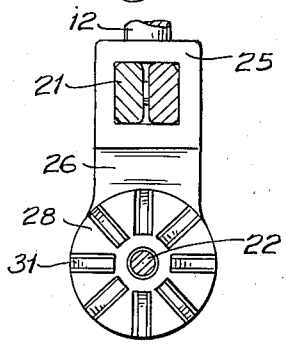
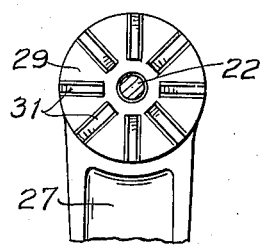
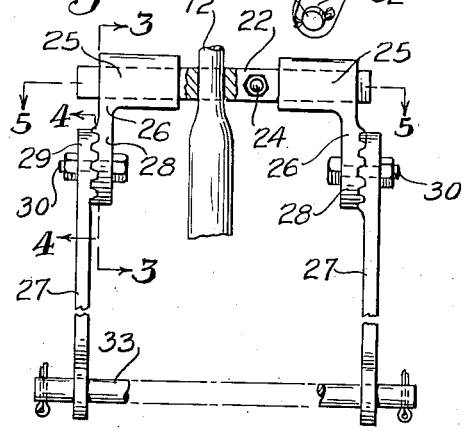
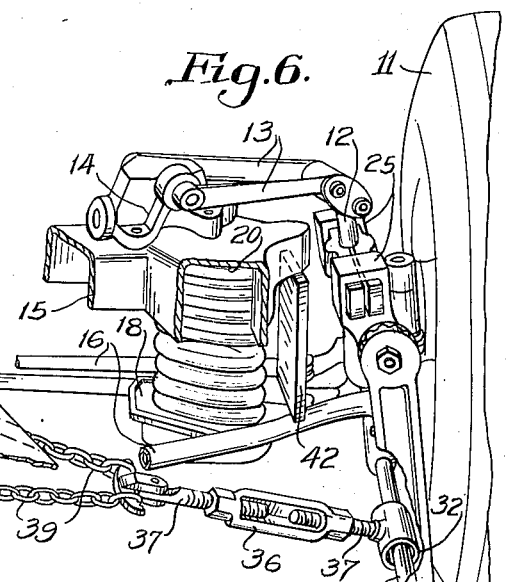
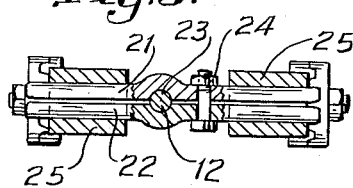
INVENTOR.
John H. Bender,
BY Myron F. Clear
ATTORNEY.

Patented Sept. 16, 1941

2,256,231

UNITED STATES PATENT OFFICE 2,256,231

CAMBER ADJUSTING DEVICE

John H. Bender, Los Angeles, Calif.

Application April 5, 1941, Serial No. 387,101

7 Claims. (Cl. 153—78)

The present invention relates generally to devices for adjusting the camber of the front wheels of an automobile or other motor car having what is commonly known as a "knee action." It is well known that an accepted and commonly used form of "knee action" involves independent up and down movements of the front wheels on an arrangement wherein the spindle bearing of each wheel is provided with an upright arm which is connected at its upper and lower ends respectively, to an upper rocker support of the body frame, and a lower rocker support of the spring suspension.

It is also well known at the present time that flexure of the upper portion of the spindle bearing arm, by the bending thereof toward and away from the wheel, admits of slight though substantial adjustments of the camber of the respective wheel. This is highly important in synchronizing the camber of the two front wheels, which cannot, in many instances, be accomplished by replacing spindle bearings, as is sometimes done to correct substantially faulty camber of one or both wheels.

Replacement of spindle bearings requires the connection and disconnection of many parts, and is costly, whereas bending or flexure of the spindle bearing arms can be accomplished, according to the present invention, without disconnecting any of the wheel supporting parts, and an object of the invention is the provision of a simple, economical and effective means of camber adjustment which is so highly desirable in the precise camber equalization of the two front wheels of a motor vehicle.

It is another object of the present invention to provide an easily and quickly applicable camber adjusting device by which a spindle bearing arm may be flexed by bending to regulate the wheel camber to a nicety for increasing or decreasing the camber, as may be desirable, and it is a still further object to provide an adjusting or bending device of this nature which will be strong and durable in use; which will admit of a choice of the type of push-pull power applying means for use therewith, and which will provide for ready regulation of its angular disposition for the most directly effective application of power thereto, as well as its proximity to the adjacent wheel for camber increasing and decreasing operations.

With the foregoing general statement and objects in mind, further objects as well as the resulting advantages of the invention may be better understood, and more thoroughly appreciated, by reference to the following detailed description of a form of the invention thus far believed to be best adapted to carry the same into practical use.

In the above mentioned description, reference is also made to the accompanying drawing, forming a part of this specification, and in which drawing:

Figure 1 is a perspective view, with certain parts broken away, showing the practical application of the invention, and with the use of a push-pull type of jack for the application of the necessary power in increasing the wheel camber.

Figure 2 is an elevation of the bending device of the invention, removed.

Figure 3 is a detail sectional view through the device of the invention, taken substantially on line 3—3 of Figure 2.

Figures 4 and 5 are similar views taken respectively on lines 4—4 and 5—5 of Figure 2, and Figure 6 is a view similar to Figure 1, showing the device in adjusting position for decreasing wheel camber, with the employment of a turnbuckle power applying means.

Referring now to the foregoing figures, there is shown in Figures 1 and 6, the front wheel assembly of a motor car embodying a "knee action" arrangement of the type in which the spindle bearing 10 of the front wheel 11 has a generally upright arm 12, flexibly connected at its upper end with the rocker 13 supported at 14 on the vehicle frame 15. The lower end of the arm 12 has a somewhat similar connection with the rocker 16 which has a support in connection with the spring suspension 17.

The spring suspension, as usual, is shown as carrying a spring seat 18. A coil spring seats on the spring seat 18, and its upper end extends into a spring pocket 20 of the frame 15.

It will be noted that the spindle bearing arm 12 which, in practise, is integral with the spindle bearing 10, has an upper portion above said bearing of substantial length, located below the upper rocker 13. It is this portion of the arm that, by flexure or bending toward and away from the wheel 11 respectively, brings about increase and decrease of wheel camber.

To accomplish the flexure or bending of the arm 12, without necessitating detachment of any of the above mentioned wheel connections, the invention proposes a device including a jaw member which, as best seen in Figures 1, 5 and 6, consists of a pair of complementary, elongated jaws 21 and 22. These jaws may have the form of bars, each being cross sectionally of such form that, when in contact throughout, their combined ends are of polygonal shape for a purpose presently to be seen. Each jaw has, intermediate its ends, a transverse, approximately semi-cylindrical groove 23, forming a clamping face. With the jaws together these grooves constitute an opening snugly embracing the spindle bearing arm 12, as in the above figures.

Preferably the jaws are connected by a cross bolt 24, passing therethrough, so that when placed in embracing relation at opposite sides of the arm 12, they may be held in such position while assembling the remaining portions of the bending device.

The mating jaws as thus constructed may be readily placed to abut one another in their effective position, and their polygonal end portions extended into the upper polygonal pockets or openings presented by the box ends 25 of a pair of side levers or arms of the bending frame, the interfitting relation of these polygonal members effectively holding the jaws 21 and 22 against rotative movement on their longitudinal axes relative to the side levers.

The side levers are preferably formed in upper and lower sections 26 and 27, the upper sections 26 including the box ends 25, above mentioned, and also having radially ribbed face plates 28 which mate with similarly ribbed face plates 29 at the upper ends of the lower sections 27. There is thus formed readily adjustable connections between the lever sections 26 and 27, so that their relative angularity may be easily changed for a purpose which will later be described.

Centrally through the mating face plates 28 and 29, clamping bolts 30 are positioned for securely maintaining meshed or interlocking relation of the ribs 31 of said plates, to thus hold any desired angular adjustment of the lever sections 26 and 27.

The lower end portions of the lower sections 27 of the side levers are also preferably provided with openings 32 therethrough, to adjustably receive the end portions of a cross bar 33, intermediately of which one end of the power applying means may be connected, as by means of a sleeve 34.

The power applying means may take any desired form, as for instance that of a push-pull jack 35 as seen in Figure 1, or a turn-buckle 36 on rods 37 as seen in Figure 6. With either of these power applying devices provided at one end with a sleeve 34, through which cross bar 33 may be extended, either a rigid bar 38 may be used as a brace or compression member where the spindle bearing arm 12 is to be bent or flexed inwardly for increasing wheel camber as in Figure 1, or a connecting chain 39 may be used as a tension member where the arm 12 is to be bent or flexed outwardly for decreasing wheel camber.

Since the space vertically along the inner side of the wheel 11 during such operations is limited, that is, when increasing wheel camber as in Figure 1, or decreasing wheel camber as in Figure 6, it is desirable in the first of the above operations to adjust the side lever or arm connections so that the lower sections of said levers incline inwardly and downwardly from the upper sections thereof, to afford greater space for the necessary movement or effective stroke of the bending frame toward the wheel.

In the second of the above mentioned operations, where wheel camber is to be decreased, the lower sections of the side levers or arms are adjusted to positions near the wheel, to thus afford maximum space for movement or stroke of the bending frame away from the wheel.

In applying the camber adjusting device of this invention, the jaws 21 and 22 are first connected, with their clamping faces in embracing relation around the spindle bearing arm 12 in the manner previously described. The polygonal boxes 25 are then fitted over the polygonal ends presented by the jaw member consisting of the above jaws, and the sections of the levers are adjusted to the desired relative angles, as also previously described, depending upon whether wheel camber is to be increased or decreased.

The cross bar 33 is then placed through one of the sets of openings 32 in the lower portions of the side levers and through the connecting sleeve 34 of the power applying means, being preferably held by simple means such as cotter pins 40. When the power applying means has been properly braced against, or connected to, a portion of the spring suspension of the vehicle, the camber adjusting operation is ready to proceed. Power applied to swing the side levers or arms toward or away from the wheel 11, tends to rotate the jaw member on its longitudinal axis and in this way flex or bend the spindle bearing arm 12 either inwardly or outwardly as the case may be.

When bending the arm 12 inwardly, as in Figure 1, a brace block 41 is placed between the frame 15 of the vehicle and the upper rockers 13, and when bending said arm 12 outwardly, as in Figure 6, a brace block 42 is placed between the frame 15 and the lower rockers 16.

By means of such a bending device as thus set forth, it is a very simple operation to adjust wheel camber to precisely gauge and equalize the camber of the two front wheels according to instruments, so as to promote the greatest ease in steering and reduce tire wear to a minimum. It is of great advantage to do this without the necessity of otherwise disturbing any of the wheel connections.

Having thus fully described the invention, what is claimed is:

1. A bending apparatus, comprising a pair of complementary jaws having recessed clamping faces in coacting relation intermediate their ends, and together forming a jaw member having polygonal end portions, a pair of levers having socket members at one end conforming to the shape, and receptive, of said jaw member ends, a connection for said levers adjacent to their opposite ends, and a power applying device engageable with said latter connection.

2. A bending apparatus comprising a pair of complementary jaws having recessed clamping faces in coacting relation intermediate their ends, and together forming a jaw member having polygonal end portions, a pair of levers having socket members at one end conforming to the shape, and receptive, of said jaw member ends, and a power applying device in connection with said levers at their opposite ends.

3. A bending apparatus, comprising a pair of complementary jaws having clamping faces intermediate the same and elongated end portions at opposite sides of said faces, which, when in abutting relation form polygonal extremities, a pair of levers having box-like upper ends presenting openings conforming to the shape, and receptive, of said jaw extremities, and a power applying device in adjustable connection with said levers adjacent to their opposite ends.

4. A bending apparatus, comprising a pair of complementary jaws having recessed clamping faces in coacting relation intermediate their ends, and together forming a jaw member having polygonal end portions, a pair of levers having socket members at one end conforming to the shape, and receptive of, said jaw member ends, and a power applying device in connection with said levers at their opposite ends, said levers including jointed sections and means for securing the sections of the levers in selected angular relationship at the joints thereof.

5. A bending device including a pair of jaws for disposition at opposite sides of a part to be bent and laterally projecting beyond said part when engaged therewith, said jaws having clamping portions intermediate their ends, means connecting said jaws in clamping relation to form substantially a single piece jaw member having cross-sectionally polygonal end portions, a pair of levers having means at one end in which the said ends of the jaw member are non-rotatably and removably disposed, and means for shifting said levers to rotate the jaw member on its longitudinal axis.

6. A bending device including a jaw member comprising detachably connected, complementary jaw bars of elongated form having clamping faces intermediate their ends, said member presenting polygonal end portions, and levers having means at one end receiving the said end portions of the jaw member in relatively non-rotatable relation.

7. A bending device including a jaw member comprising detachably connected, complementary jaw bars of elongated form having clamping faces intermediate their ends, said member presenting polygonal end portions, longitudinally sectional levers having means at one end thereof receiving the said end portions of the jaw member in non-rotatable relation, and adjustable clamping joints between the sections of the levers, the sections of each lever being angularly adjustable relative to each other on said joints.

JOHN H. BENDER.